(12) United States Patent
Pacorel et al.

(10) Patent No.: US 8,900,495 B2
(45) Date of Patent: Dec. 2, 2014

(54) MOLASSES BINDER

(75) Inventors: Benedicte Pacorel, St. Helens (GB); Carl A Hampson, St. Helens (GB)

(73) Assignee: Knauf Insulation, Vise (BE)

( * ) Notice: Subject to any disclaimer, the term of this patent is extended or adjusted under 35 U.S.C. 154(b) by 136 days.

(21) Appl. No.: 13/388,408

(22) PCT Filed: Aug. 9, 2010

(86) PCT No.: PCT/IB2010/001996
§ 371 (c)(1),
(2), (4) Date: Feb. 1, 2012

(87) PCT Pub. No.: WO2110/015946
PCT Pub. Date: Feb. 10, 2011

(65) Prior Publication Data
US 2012/0133073 A1    May 31, 2012

Related U.S. Application Data (60) Provisional application No. 61/232,255, filed on Aug. 7, 2009.

(51) Int. Cl.
*C08F 251/00* (2006.01)
*C08F 8/14* (2006.01)

(52) U.S. Cl.
CPC ..................................... *C08F 8/14* (2013.01)
USPC .............. 264/128; 264/109; 524/14; 527/312

(58) Field of Classification Search
None
See application file for complete search history.

(56) References Cited

U.S. PATENT DOCUMENTS

| | | |
|---|---|---|
| 1,801,052 A | 4/1931 | Meigs |
| 1,801,053 A | 4/1931 | Meigs |
| 1,886,353 A | 11/1932 | Novotny et al. |
| 2,198,874 A | 4/1940 | Holmes |
| 2,215,825 A | 9/1940 | Wallace |
| 2,500,665 A | 3/1944 | Courtright |
| 2,392,105 A | 1/1946 | Sussman |
| 2,442,989 A | 6/1948 | Sussman |
| 2,518,956 A | 8/1950 | Sussman |
| 2,875,073 A | 2/1959 | Gogek |
| 3,232,821 A | 2/1966 | Moore et al. |
| 3,297,419 A | 1/1967 | Eyre, Jr. |
| 3,513,001 A | 5/1970 | Worthington et al. |
| 3,551,365 A | 12/1970 | Matalon |
| 3,791,807 A | 2/1974 | Etzel et al. |
| 3,802,897 A | 4/1974 | Voigt et al. |
| 3,809,664 A | 5/1974 | Fanta |
| 3,826,767 A | 7/1974 | Hoover et al. |
| 3,856,606 A | 12/1974 | Fan et al. |
| 3,867,119 A | 2/1975 | Kasuga et al. |
| 3,911,048 A | 10/1975 | Vargiu et al. |
| 3,961,081 A | 6/1976 | McEnzie |
| 3,971,807 A | 7/1976 | Brack |
| 4,014,726 A | 3/1977 | Fargo |
| 4,028,290 A | 6/1977 | Reid |
| 4,048,127 A | 9/1977 | Gibbons et al. |
| 4,054,713 A | 10/1977 | Sakaguchi et al. |
| 4,085,076 A | 4/1978 | Gibbons et al. |
| 4,097,427 A | 6/1978 | Aitken et al. |
| 4,107,379 A | 8/1978 | Stofko |
| 4,144,027 A | 3/1979 | Habib |
| 4,148,765 A | 4/1979 | Nelson |
| 4,183,997 A | 1/1980 | Stofko |
| 4,184,986 A | 1/1980 | Krasnobajew et al. |
| 4,186,053 A | 1/1980 | Krasnobajew et al. |
| 4,201,857 A | 5/1980 | Krasnobajew et al. |
| 4,233,432 A | 11/1980 | Curtis, Jr. |
| 4,246,367 A | 1/1981 | Curtis, Jr. |
| 4,259,190 A | 3/1981 | Fahey |
| 4,265,963 A | 5/1981 | Matalon |
| 4,278,573 A | 7/1981 | Tessler |
| 4,296,173 A | 10/1981 | Fahey |
| 4,301,310 A | 11/1981 | Wagner |
| 4,322,523 A | 3/1982 | Wagner |
| 4,330,443 A | 5/1982 | Rankin |
| 4,357,194 A | 11/1982 | Stofko |
| 4,396,430 A | 8/1983 | Matalon |
| 4,400,496 A | 8/1983 | Butler et al. |
| 4,464,523 A | 8/1984 | Neigel et al. |
| 4,506,684 A | 3/1985 | Keritsis |
| 4,520,143 A | 5/1985 | Jellinek |
| 4,524,164 A * | 6/1985 | Viswanathan et al. .......... 524/14 |

(Continued)

FOREIGN PATENT DOCUMENTS

| | | |
|---|---|---|
| AU | 782086 | 6/2005 |
| CA | 2037214 | 9/1991 |

(Continued)

OTHER PUBLICATIONS

International Search Report and Written Opinion for PCT/US2008/059730, completed Sep. 22, 2008.

(Continued)

*Primary Examiner* — Mary F Theisen
(74) *Attorney, Agent, or Firm* — Knauf Insulation; James K. Blodgett (57) ABSTRACT

A binder based predominantly on molasses which incorporates both polymeric and monomeric polycarboxylic acid components to form a composite including both melanoidin and polyester polymeric structures. The binder incorporates the chemical profile of molasses with a mixture of polycarboxylic acids which combines to form a strong and weatherable binder composition which may be used to bind loosely or non-assembled matter.

22 Claims, 1 Drawing Sheet

(56) References Cited

U.S. PATENT DOCUMENTS

| | | |
|---|---|---|
| 4,631,226 A | 12/1986 | Jellinek |
| 4,668,716 A | 5/1987 | Pepe et al. |
| 4,692,478 A | 9/1987 | Viswanathan et al. |
| 4,714,727 A | 12/1987 | Hume, III |
| 4,754,056 A | 6/1988 | Ansel et al. |
| 4,761,184 A | 8/1988 | Markessini |
| 4,845,162 A | 7/1989 | Schmitt et al. |
| 4,906,237 A | 3/1990 | Johansson et al. |
| 4,912,147 A | 3/1990 | Pfoehler et al. |
| 4,923,980 A | 5/1990 | Blomberg |
| 4,950,444 A | 8/1990 | Deboufie et al. |
| 4,992,519 A | 2/1991 | Mukherjee |
| 5,037,930 A | 8/1991 | Shih |
| 5,041,595 A | 8/1991 | Yang et al. |
| 5,089,342 A | 2/1992 | Dhein et al. |
| 5,095,054 A | 3/1992 | Lay et al. |
| 5,106,615 A | 4/1992 | Dikstein |
| 5,114,004 A | 5/1992 | Isono et al. |
| 5,123,949 A | 6/1992 | Thiessen |
| 5,124,369 A | 6/1992 | Vandichel et al. |
| 5,128,407 A | 7/1992 | Layton et al. |
| 5,143,582 A | 9/1992 | Arkens et al. |
| 5,151,465 A | 9/1992 | Le-Khac |
| 5,167,738 A | 12/1992 | Bichot et al. |
| 5,278,222 A | 1/1994 | Stack |
| 5,300,144 A | 4/1994 | Adams |
| 5,300,192 A | 4/1994 | Hansen et al. |
| 5,308,896 A | 5/1994 | Hansen et al. |
| 5,318,990 A | 6/1994 | Strauss |
| 5,336,753 A | 8/1994 | Jung et al. |
| 5,336,755 A | 8/1994 | Pape |
| 5,340,868 A | 8/1994 | Strauss et al. |
| 5,352,480 A | 10/1994 | Hansen et al. |
| 5,371,194 A | 12/1994 | Ferretti |
| 5,387,665 A | 2/1995 | Misawa et al. |
| 5,393,849 A | 2/1995 | Srinivasan et al. |
| 5,416,139 A | 5/1995 | Zeiszler |
| 5,421,838 A | 6/1995 | Gosset et al. |
| 5,424,418 A | 6/1995 | Duflot |
| 5,434,233 A | 7/1995 | Kiely et al. |
| 5,447,977 A | 9/1995 | Hansen et al. |
| 5,480,973 A | 1/1996 | Goodlad et al. |
| 5,492,756 A | 2/1996 | Seale et al. |
| 5,498,662 A | 3/1996 | Tanaka et al. |
| 5,536,766 A | 7/1996 | Seyffer et al. |
| 5,538,783 A | 7/1996 | Hansen et al. |
| 5,543,215 A | 8/1996 | Hansen et al. |
| 5,545,279 A | 8/1996 | Hall et al. |
| 5,547,541 A | 8/1996 | Hansen et al. |
| 5,547,745 A | 8/1996 | Hansen et al. |
| 5,550,189 A | 8/1996 | Qin et al. |
| 5,562,740 A | 10/1996 | Cook et al. |
| 5,571,618 A | 11/1996 | Hansen et al. |
| 5,578,678 A | 11/1996 | Hartmann et al. |
| 5,580,856 A | 12/1996 | Prestrelski et al. |
| 5,582,682 A | 12/1996 | Ferretti |
| 5,583,193 A | 12/1996 | Aravindakshan et al. |
| 5,589,256 A | 12/1996 | Hansen et al. |
| 5,589,536 A | 12/1996 | Golino et al. |
| 5,607,759 A | 3/1997 | Hansen et al. |
| 5,608,011 A | 3/1997 | Eck et al. |
| 5,609,727 A | 3/1997 | Hansen et al. |
| 5,614,570 A | 3/1997 | Hansen et al. |
| 5,620,940 A | 4/1997 | Birbara et al. |
| 5,621,026 A | 4/1997 | Tanaka et al. |
| 5,633,298 A | 5/1997 | Arfaei et al. |
| 5,641,561 A | 6/1997 | Hansen et al. |
| 5,643,978 A | 7/1997 | Darwin et al. |
| 5,645,756 A | 7/1997 | Dubin et al. |
| 5,661,213 A | 8/1997 | Arkens et al. |
| 5,672,418 A | 9/1997 | Hansen et al. |
| 5,690,715 A | 11/1997 | Schiwek |
| 5,691,060 A | 11/1997 | Levy |
| 5,693,411 A | 12/1997 | Hansen et al. |
| 5,756,580 A | 5/1998 | Natori et al. |
| 5,763,524 A | 6/1998 | Arkens et al. |
| 5,788,243 A | 8/1998 | Harshaw et al. |
| 5,807,364 A | 9/1998 | Hansen |
| 5,855,987 A | 1/1999 | Margel et al. |
| 5,863,985 A | 1/1999 | Shalaby et al. |
| 5,885,337 A | 3/1999 | Nohr et al. |
| 5,895,804 A | 4/1999 | Lee et al. |
| 5,905,115 A | 5/1999 | Luitjes et al. |
| 5,919,528 A | 7/1999 | Huijs et al. |
| 5,919,831 A | 7/1999 | Philipp |
| 5,925,722 A | 7/1999 | Exner et al. |
| 5,929,184 A | 7/1999 | Holmes-Farley et al. |
| 5,929,196 A | 7/1999 | Kissel et al. |
| 5,932,344 A | 8/1999 | Ikemoto et al. |
| 5,932,665 A | 8/1999 | DePorter et al. |
| 5,932,689 A | 8/1999 | Arkens et al. |
| 5,942,123 A | 8/1999 | McArdle |
| 5,954,869 A | 9/1999 | Elfersy et al. |
| 5,977,224 A | 11/1999 | Cheung et al. |
| 5,977,232 A | 11/1999 | Arkens et al. |
| 5,981,719 A | 11/1999 | Woiszwillo et al. |
| 5,983,586 A | 11/1999 | Berdan, II et al. |
| 5,990,216 A | 11/1999 | Cai et al. |
| 6,022,615 A | 2/2000 | Rettenbacher |
| 6,071,549 A | 6/2000 | Hansen |
| 6,071,994 A | 6/2000 | Hummerich et al. |
| 6,072,086 A | 6/2000 | James et al. |
| 6,077,883 A | 6/2000 | Taylor et al. |
| 6,090,925 A | 7/2000 | Woiszwillo et al. |
| 6,114,033 A | 9/2000 | Ikemoto et al. |
| 6,114,464 A | 9/2000 | Reck et al. |
| 6,136,916 A | 10/2000 | Arkens et al. |
| 6,143,243 A | 11/2000 | Gershun et al. |
| 6,171,444 B1 | 1/2001 | Nigam |
| 6,171,654 B1 | 1/2001 | Salsman et al. |
| 6,180,037 B1 | 1/2001 | Andersen et al. |
| 6,210,472 B1 | 4/2001 | Kwan et al. |
| 6,221,958 B1 | 4/2001 | Shalaby et al. |
| 6,221,973 B1 | 4/2001 | Arkens et al. |
| 6,231,721 B1 | 5/2001 | Quick et al. |
| 6,274,661 B1 | 8/2001 | Chen et al. |
| 6,299,936 B1 | 10/2001 | Reck et al. |
| 6,307,732 B1 | 10/2001 | Tsubaki et al. |
| 6,310,227 B1 | 10/2001 | Sarama et al. |
| 6,313,102 B1 | 11/2001 | Colaco et al. |
| 6,319,683 B1 | 11/2001 | James et al. |
| 6,331,350 B1 | 12/2001 | Taylor et al. |
| 6,331,513 B1 | 12/2001 | Zaid et al. |
| 6,340,411 B1 | 1/2002 | Hansen et al. |
| 6,348,530 B1 | 2/2002 | Reck et al. |
| 6,365,079 B1 | 4/2002 | Winkler et al. |
| 6,372,077 B1 | 4/2002 | Tecle |
| 6,379,739 B1 | 4/2002 | Formanek et al. |
| 6,395,856 B1 | 5/2002 | Petty et al. |
| 6,403,665 B1 | 6/2002 | Sieker et al. |
| 6,407,225 B1 | 6/2002 | Mang et al. |
| 6,410,036 B1 | 6/2002 | De Rosa et al. |
| 6,440,204 B1 | 8/2002 | Rogols et al. |
| 6,461,553 B1 | 10/2002 | Hansen et al. |
| 6,468,442 B2 | 10/2002 | Bytnar |
| 6,468,730 B2 | 10/2002 | Fujiwara et al. |
| 6,469,120 B1 | 10/2002 | Elfersy et al. |
| 6,475,552 B1 | 11/2002 | Shah et al. |
| 6,482,875 B2 | 11/2002 | Lorenz et al. |
| 6,495,656 B1 | 12/2002 | Haile et al. |
| 6,521,339 B1 | 2/2003 | Hansen et al. |
| 6,525,009 B2 | 2/2003 | Sachdev et al. |
| 6,538,057 B1 | 3/2003 | Wildburg et al. |
| 6,547,867 B2 | 4/2003 | Rogols et al. |
| 6,559,302 B1 | 5/2003 | Shah et al. |
| 6,596,103 B1 | 7/2003 | Hansen et al. |
| 6,613,378 B1 | 9/2003 | Erhan et al. |
| 6,638,882 B1 | 10/2003 | Helbing et al. |
| 6,638,884 B2 | 10/2003 | Quick et al. |
| 6,699,945 B1 | 3/2004 | Chen et al. |
| 6,719,862 B2 | 4/2004 | Quick et al. |
| 6,730,730 B1 | 5/2004 | Hansen et al. |
| 6,753,361 B2 | 6/2004 | Kroner et al. |
| 6,818,694 B2 | 11/2004 | Hindi et al. |

(56) References Cited

U.S. PATENT DOCUMENTS

| | | |
|---|---|---|
| 6,821,547 B2 | 11/2004 | Shah et al. |
| 6,852,247 B2 | 2/2005 | Bytnar |
| 6,858,074 B2 | 2/2005 | Anderson et al. |
| 6,861,495 B2 | 3/2005 | Barsotti et al. |
| 6,864,044 B2 | 3/2005 | Ishikawa et al. |
| 6,878,800 B2 | 4/2005 | Husemoen et al. |
| 6,884,849 B2 | 4/2005 | Chen et al. |
| 6,955,844 B2 | 10/2005 | Tagge et al. |
| 6,962,714 B2 | 11/2005 | Hei et al. |
| 6,989,171 B2 | 1/2006 | Portman |
| 6,992,203 B2 | 1/2006 | Trusovs |
| 7,018,490 B2 | 3/2006 | Hansen et al. |
| 7,029,717 B1 | 4/2006 | Ojima et al. |
| 7,067,579 B2 | 6/2006 | Taylor et al. |
| 7,083,831 B1 | 8/2006 | Koch et al. |
| 7,090,745 B2 | 8/2006 | Beckman et al. |
| 7,141,626 B2 | 11/2006 | Rodrigues et al. |
| 7,144,474 B1 | 12/2006 | Hansen et al. |
| 7,195,792 B2 | 3/2007 | Boston et al. |
| 7,201,778 B2 | 4/2007 | Smith et al. |
| 7,201,825 B2 | 4/2007 | Dezutter et al. |
| 7,202,326 B2 | 4/2007 | Kuroda et al. |
| 7,241,487 B2 | 7/2007 | Taylor et al. |
| 7,458,235 B2 | 12/2008 | Beaufils et al. |
| 7,514,027 B2 | 4/2009 | Horres et al. |
| 7,655,711 B2 | 2/2010 | Swift et al. |
| 7,772,347 B2 | 8/2010 | Swift et al. |
| 7,795,354 B2 | 9/2010 | Srinivasan et al. |
| 7,803,879 B2 | 9/2010 | Srinivasan et al. |
| 7,807,771 B2 | 10/2010 | Swift et al. |
| 7,842,382 B2 | 11/2010 | Helbing et al. |
| 7,854,980 B2 | 12/2010 | Jackson et al. |
| 7,883,693 B2 | 2/2011 | Sehl et al. |
| 7,888,445 B2 | 2/2011 | Swift et al. |
| 7,947,765 B2 | 5/2011 | Swift et al. |
| 8,114,210 B2 | 2/2012 | Hampson et al. |
| 8,182,648 B2 | 5/2012 | Swift et al. |
| 8,232,334 B2* | 7/2012 | Kelly et al. .............. 524/14 |
| 8,372,900 B2 | 2/2013 | Shooshtari et al. |
| 8,377,564 B2 | 2/2013 | Shooshtari et al. |
| 8,501,838 B2 | 8/2013 | Jackson et al. |
| 2002/0028857 A1 | 3/2002 | Holy |
| 2002/0032253 A1 | 3/2002 | Lorenz et al. |
| 2002/0091185 A1 | 7/2002 | Taylor et al. |
| 2002/0130439 A1 | 9/2002 | Kroner et al. |
| 2002/0161108 A1 | 10/2002 | Schultz et al. |
| 2003/0005857 A1 | 1/2003 | Minami et al. |
| 2003/0071879 A1 | 4/2003 | Swenson |
| 2003/0153690 A1 | 8/2003 | Husemoen et al. |
| 2004/0019168 A1 | 1/2004 | Soerens et al. |
| 2004/0024170 A1 | 2/2004 | Husemoen et al. |
| 2004/0033747 A1 | 2/2004 | Miller et al. |
| 2004/0034154 A1 | 2/2004 | Tutin et al. |
| 2004/0038017 A1 | 2/2004 | Tutin et al. |
| 2004/0077055 A1 | 4/2004 | Fosdick et al. |
| 2004/0122166 A1 | 6/2004 | O'Brien-Bernini et al. |
| 2004/0131874 A1 | 7/2004 | Tutin et al. |
| 2004/0152824 A1 | 8/2004 | Dobrowolski |
| 2004/0213930 A1 | 10/2004 | Halabisky |
| 2004/0249066 A1 | 12/2004 | Heinzman et al. |
| 2004/0254285 A1 | 12/2004 | Rodrigues et al. |
| 2004/0260082 A1 | 12/2004 | Van Der Wilden et al. |
| 2005/0017394 A1 | 1/2005 | Hochsmann et al. |
| 2005/0048212 A1 | 3/2005 | Clamen et al. |
| 2005/0059770 A1 | 3/2005 | Srinivasan et al. |
| 2005/0171085 A1 | 8/2005 | Pinto et al. |
| 2005/0196421 A1 | 9/2005 | Hunter et al. |
| 2005/0202224 A1 | 9/2005 | Helbing |
| 2005/0215153 A1 | 9/2005 | Cossement et al. |
| 2005/0245669 A1 | 11/2005 | Clungeon et al. |
| 2005/0275133 A1 | 12/2005 | Cabell et al. |
| 2006/0005580 A1 | 1/2006 | Espiard et al. |
| 2006/0044302 A1 | 3/2006 | Chen |
| 2006/0099870 A1 | 5/2006 | Garcia et al. |
| 2006/0111480 A1 | 5/2006 | Hansen |
| 2006/0135433 A1 | 6/2006 | Murray et al. |
| 2006/0198954 A1 | 9/2006 | Frechem et al. |
| 2006/0231487 A1 | 10/2006 | Bartley et al. |
| 2006/0252855 A1 | 11/2006 | Pisanova et al. |
| 2006/0281622 A1 | 12/2006 | Maricourt et al. |
| 2007/0006390 A1 | 1/2007 | Clamen et al. |
| 2007/0009582 A1 | 1/2007 | Madsen et al. |
| 2007/0027281 A1 | 2/2007 | Michl et al. |
| 2007/0027283 A1* | 2/2007 | Swift et al. .............. 527/312 |
| 2007/0123679 A1 | 5/2007 | Swift et al. |
| 2007/0123680 A1 | 5/2007 | Swift et al. |
| 2007/0129522 A1 | 6/2007 | Burckhardt et al. |
| 2007/0142596 A1 | 6/2007 | Swift et al. |
| 2007/0184740 A1 | 8/2007 | Keller et al. |
| 2007/0270070 A1 | 11/2007 | Hamed |
| 2008/0060551 A1 | 3/2008 | Crews et al. |
| 2008/0108741 A1 | 5/2008 | Van Herwijnen et al. |
| 2008/0194738 A1 | 8/2008 | Crews et al. |
| 2009/0169867 A1 | 7/2009 | Kelly |
| 2009/0301972 A1 | 12/2009 | Hines et al. |
| 2009/0324915 A1 | 12/2009 | Swift et al. |
| 2010/0029160 A1 | 2/2010 | Srinivasan et al. |
| 2010/0087571 A1* | 4/2010 | Jackson et al. .............. 524/13 |
| 2010/0098947 A1 | 4/2010 | Inoue et al. |
| 2010/0130649 A1 | 5/2010 | Swift et al. |
| 2010/0175826 A1 | 7/2010 | Huenig et al. |
| 2010/0222463 A1 | 9/2010 | Brady et al. |
| 2010/0282996 A1* | 11/2010 | Jaffrennou et al. .......... 252/8.83 |
| 2010/0301256 A1 | 12/2010 | Hampson et al. |
| 2010/0320113 A1 | 12/2010 | Swift |
| 2011/0039111 A1 | 2/2011 | Shooshtari |
| 2011/0040010 A1 | 2/2011 | Shooshtari |
| 2011/0042303 A1 | 2/2011 | Shooshtari |
| 2011/0045966 A1 | 2/2011 | Shooshtari et al. |
| 2011/0089074 A1 | 4/2011 | Jackson et al. |
| 2011/0135937 A1 | 6/2011 | Swift et al. |
| 2011/0190425 A1 | 8/2011 | Swift |
| 2011/0220835 A1 | 9/2011 | Swift et al. |
| 2011/0260094 A1 | 10/2011 | Hampson et al. |
| 2011/0262648 A1 | 10/2011 | Lee et al. |
| 2011/0263757 A1 | 10/2011 | Rand et al. |
| 2012/0133073 A1 | 5/2012 | Pacorel et al. |
| 2012/0156954 A1 | 6/2012 | Eckert et al. |
| 2013/0029150 A1 | 1/2013 | Appley et al. |
| 2013/0047888 A1 | 2/2013 | Mueller et al. |
| 2013/0059075 A1 | 3/2013 | Appley et al. |
| 2013/0082205 A1 | 4/2013 | Mueller et al. |
| 2013/0234362 A1 | 9/2013 | Swift et al. |
| 2013/0236650 A1 | 9/2013 | Swift et al. |
| 2013/0237113 A1 | 9/2013 | Swift et al. |
| 2013/0244524 A1 | 9/2013 | Swift et al. |

FOREIGN PATENT DOCUMENTS

| | | |
|---|---|---|
| CA | 2470783 | 12/2004 |
| DE | 4308089 | 9/1994 |
| DE | 102004033561 | 9/2005 |
| DE | 102005023431 A1 | 11/2006 |
| EP | 0044614 | 1/1982 |
| EP | 0099801 | 2/1984 |
| EP | 354023 A2 | 2/1990 |
| EP | 0461995 | 12/1991 |
| EP | 0524518 | 7/1992 |
| EP | 0547819 A2 | 6/1993 |
| EP | 0583086 | 7/1993 |
| EP | 0672720 | 3/1995 |
| EP | 0714754 | 6/1996 |
| EP | 0826710 | 8/1997 |
| EP | 796681 A2 | 9/1997 |
| EP | 0873976 | 4/1998 |
| EP | 0882756 | 12/1998 |
| EP | 0911361 | 4/1999 |
| EP | 0915811 B1 | 5/1999 |
| EP | 0990729 | 4/2000 |
| EP | 1038433 | 9/2000 |
| EP | 1193288 A1 | 4/2002 |
| EP | 1225193 | 7/2002 |
| EP | 1084167 B1 | 9/2002 |
| EP | 1268702 B1 | 1/2003 |

(56) References Cited

FOREIGN PATENT DOCUMENTS

| | | |
|---|---|---|
| EP | 1382642 | 1/2004 |
| EP | 1486547 A2 | 12/2004 |
| EP | 1698598 A1 | 9/2006 |
| EP | 1767566 B1 | 4/2007 |
| EP | 2223941 | 9/2010 |
| FR | 2614388 | 10/1988 |
| GB | 809675 | 3/1959 |
| GB | 926749 | 5/1963 |
| GB | 1391172 | 4/1975 |
| GB | 1512066 | 5/1978 |
| GB | 2047258 | 11/1980 |
| GB | 2078805 A | 1/1982 |
| GB | 2173523 A | 10/1986 |
| GB | 2251438 A | 7/1992 |
| JP | 57101100 | 6/1982 |
| JP | 5811193 | 1/1983 |
| JP | 3-173680 | 7/1991 |
| JP | 7-034023 A | 2/1995 |
| JP | 2000327841 | 11/2000 |
| JP | 2004060058 | 2/2001 |
| JP | 2002293576 | 9/2002 |
| SU | 374400 | 3/1973 |
| WO | 9007541 | 7/1990 |
| WO | 9212198 A1 | 7/1992 |
| WO | 9749646 | 12/1997 |
| WO | 9936368 | 7/1999 |
| WO | 9947765 | 9/1999 |
| WO | 9960043 | 11/1999 |
| WO | 0058085 | 10/2000 |
| WO | 0114491 A1 | 3/2001 |
| WO | 0200429 | 1/2002 |
| WO | 03029496 A1 | 4/2003 |
| WO | 03071879 A1 | 9/2003 |
| WO | 03106561 | 12/2003 |
| WO | 2004076734 | 9/2004 |
| WO | 2005087837 | 9/2005 |
| WO | 2006044302 | 4/2006 |
| WO | 2006136614 | 12/2006 |
| WO | 2007014236 | 2/2007 |
| WO | 2007024020 A1 | 3/2007 |
| WO | 2007050964 A1 | 5/2007 |
| WO | 2010139899 A1 | 12/2010 |
| WO | 2011138459 | 11/2011 |

OTHER PUBLICATIONS

International Search Report and Written Opinion for PCT/US2008/069046, completed Sep. 25, 2008.
International Search Report and Written Opinion for PCT/US2008/060185, completed Oct. 14, 2008.
International Search Report for PCT/EP2011/057363, completed Sep. 5, 2011.
Office action for co-pending U.S. Appl. No. 12/524,522 (5 pages).
Office action for co-pending U.S. Appl. No. 12/671,922 (11 pages).
Ames, J.M., "The Maillard Browning Reaction—an Update,"Chemistry & Industry, No. 17, 1988, 4 pages.
"Gamma-aminopropyltrimethoxysilane, "Hawley's Condensed Chemical Dictionary, 14th Edition, John Wiley & Sons, Inc., 2002, 1 page.
Hodge, J.E., Chemistry of Browning Reactions in Model Systems,: 1953, J.Argic. Food Chem., vol. 1, No. 15, pp. 928-943.
Agyei-Aye et al., "The Role of Anion in the Reaction of Reducing Sugars with Ammonium Salts," Carbohydrate Research 2002, 337: 2273-2277.
Bjorksten et al., "Polyester Resin—Glass Fiber Laminates," Industrial and Engineering Chemistry (1954).
Dow Corning, "A Guide to Silane Solutions," 2005.
Knauf Data Sheet, 2006.
Molasses Corporation, United States Sugar Corporation, http://www.suga-lik.com/molasses/composition.html (Sep. 29, 2003).
Clamen, Guy, "Acrylic Thermosets: A Safe Alternative to Formaldehyde Resins," Nonwovens World, Apr.-May 2004, pp. 96-102.
Opposition to AU 2006272595, Amended Statement of Grounds and Particulars, issued from Australian Patent Office, Jul. 6, 22 pages.
Opposition to EP 1732968, Notice of Opposition: Prior Art, Scope of the Patent, Reasons for the Opposition, issued from European Patent Office, Mar. 8, 2012, 18 pages.
Owens Corning Retiree Update: What Goes around, Comes around: A tale of Natural Binders, revised Mar. 20, 2013 p. 4.
A.P. Bryant, "The Terminology of Sugars," Industrial and Engineering Chemistry, vol. 26, No. 2, p. 231, Feb. 1934.
Office action for co-pending U.S. Appl. No. 12/671,922 (10 pages).
Office action for co-pending U.S. Appl. No. 13/371,829 (9 pages).
Office action for co-pending U.S. Appl. No. 13/371,829 (6 pages).
Office action for co-pending U.S. Appl. No. 13/866,368 (16 pages).
Office action for co-pending U.S. Appl. No. 13/866,368 (11 pages).
Office action for co-pending U.S. Appl. No. 13/866,419 (14 pages).
Office action for co-pending U.S. Appl. No. 13/866,419 (10 pages).
Office action for co-pending U.S. Appl. No. 13/868,233 (23 pages).
Office action for co-pending U.S. Appl. No. 13/868,233 (12 pages).
Office action for co-pending U.S. Appl. No. 12/976,379 (8 pages).
Office action for co-pending U.S. Appl. No. 13/341,542 (8 pages).
Office action for co-pending U.S. Appl. No. 13/341,542 (7 pages).

\* cited by examiner

MOLASSES BINDER

CROSS-REFERENCE TO RELATED APPLICATIONS

This application is the U.S. national phase of PCT/IB2010/001996 filed Aug. 9, 2010. PCT/IB2010/001996 claims priority to U.S. Provisional Patent Application No. 61/232,255, filed Aug. 7, 2009, the entirety of both of which are hereby incorporated herein by reference.

TECHNICAL FIELD

This disclosure relates to a molasses binder composition for binding loosely or non-assembled matter. In particular, a molasses binder composition and articles fabricated from binding non- or loosely assembled matter with a molasses binder composition is described.

BACKGROUND

Thermosetting binders comprise a variety of phenol-aldehyde, urea-aldehyde, melamine-aldehyde, and other condensation-polymerization materials like the furane and polyurethane resins. Thermosetting binders may be characterized by being transformed into insoluble and infusible materials by means of either heat or catalytic action. Binder compositions containing phenol-, resorcinol-, urea-, melamine-formaldehyde, phenolfurfuraldehyde, and the like are used for the bonding of textiles, plastics, rubbers, and many other materials.

The effluent obtained in the preparation of sucrose by repeated evaporation, crystallization and centrifugation of juices from sugar cane and from sugar beets is referred to as molasses. Cane molasses is a by-product of the manufacture or refining of sucrose from sugar cane. Beet molasses is a by-product of the manufacture of sucrose from sugar beets. Citrus molasses is the partially dehydrated juices obtained from the manufacture of dried citrus pulp. Hemicellulose extract is a mixture of pentose and hexose sugars which is a by-product of the manufacture of pressed wood. Specifically hemicellulose extract is a molasses that is the concentrated soluble material obtained from the treatment of wood at elevated temperature and pressure, typically without use of acids, alkalis, or salts. Starch molasses is a by-product of dextrose manufactured from starch derived from corn or grain sorghums wherein the starch is hydrolyzed by enzymes and/or acid.

Historically, molasses has been used as a binder within various commercial products. For example, U.S. Pat. No. 3,961,081 describes using molasses as a binder in preparing livestock feed. U.S. Pat. No. 5,416,139 describes using molasses as a binder in the manufacture of structural building materials and French Published Application FR 2,924,719 describes using molasses in the manufacture of mineral wool insulation materials.

The glass wool or mineral wool industry has historically used a phenol formaldehyde (PF) binder to bind the fibers. PF binders provide suitable properties to the final products; however, environmental considerations have motivated the development of alternative binders. One such alternative binder is the nitrogenous polymer derived from reacting a carbohydrate and an amine base, for example, U.S. Published Application No. 2005/0027283. Another alternative binder is the esterification products of reacting a polycarboxylic acid and a polyol, for example, U.S. Published Application No. 2005/0202224.

SUMMARY OF THE DISCLOSURE

According to the present disclosure, a binder composition comprises molasses and a polycarboxylic acid formulated for causing cohesion upon contacting non- or loosely assembled matter.

In illustrative embodiments, the binder comprises molasses, a monomeric polycarboxylic acid and a polymeric polycarboxylic acid. In one embodiment, the binder exhibits significant resistance to weathering. In one embodiment, the binder is a composite melanoidin and polyester product comprising products of reacting a molasses with a polymeric polycarboxylic acid and monomeric polycarboxylic acid in the presence of a sodium hypophosphite catalyst. In another embodiment, the ratio of the polymeric polycarboxylic acid to the monomeric polycarboxylic acid is from about 0.25 to about 1.5 by weight.

DETAILED DESCRIPTION

While the invention is susceptible to various modifications and alternative forms, specific embodiments will herein be described in detail. It should be understood, however, that there is no intent to limit the invention to the particular forms described, but on the contrary, the intention is to cover all modifications, equivalents, and alternatives falling within the spirit and scope of the invention.

It should be appreciated that the binders described herein may be used in manufacturing products from a collection of non- or loosely assembled matter. For example, these binders may be employed to fabricate fiber products. These products may be made from woven or non-woven fibers. The fibers can be heat-resistant or non-heat-resistant fibers or combinations thereof. In one illustrative embodiment, the binders are used to bind mineral fibers to make mineral wool thermal insulation. For example, the binders are used to bind glass fibers to make fiberglass. In another illustrative embodiment, the binders are used to make cellulosic compositions. With respect to cellulosic compositions, the binders may be used to bind cellulosic matter to fabricate, for example, wood fiber board which has desirable physical properties (e.g., mechanical strength).

One embodiment of the invention is directed to a method for manufacturing products from a collection of non- or loosely assembled matter. One example of using this method is in the fabrication of mineral wool insulation, for example fiberglass. Another example of using this method is the fabrication of rock wool thermal insulation. Yet another example of using this method is the fabrication of wood board from cellulosic fibers. However, as indicated above, this method can be utilized in the fabrication of any material, as long as the method produces or promotes cohesion when utilized.

As used herein, the phrase "formaldehyde-free" means that a binder or a material that incorporates a binder liberates less than about 1 ppm formaldehyde as a result of drying and/or curing. The 1 ppm is based on the weight of sample being measured for formaldehyde release. One aspect of the present invention is that the binders described herein can be manufactured as formaldehyde-free.

The term "cured" indicates that the binder has been exposed to conditions so as to initiate a chemical change.

Examples of these chemical changes include, but are not limited to, (i) covalent bonding, (ii) hydrogen bonding of binder components, and chemically cross-linking the polymers and/or oligomers in the binder. These changes may increase the binder's durability and solvent resistance as compared to the uncured binder. Curing a binder may result in the formation of a thermoset material. In addition, a cured binder may result in an increase in adhesion between the matter in a collection as compared to an uncured binder. Curing can be initiated by, for example, heat, electromagnetic radiation or, electron beams.

In a situation where the chemical change in the binder results in the release of water, e.g. polymerization and cross-linking, a cure can be determined by the amount of water released above that would occur from drying alone. The techniques used to measure the amount of water released during drying as compared to when a binder is cured, are well known in the art. In contrast, an uncured binder is one that has not been cured.

In illustrative embodiments, a binder composition comprises a polymeric product of a reaction between molasses, a polymeric polycarboxylic acid, and a monomeric polycarboxylic acid. In one embodiment, the polymeric product comprises predominantly molasses. For example the polymeric product has a total weight that is attributable primarily to the amount of molasses used or the weight percentage of molasses is greater than the weight percentage of all other components. In another embodiment, the binder composition is a polymeric product of a catalyzed reaction between molasses, a polymeric polycarboxylic acid, and a monomeric polycarboxylic acid. For example, sodium hypophosphite may be used as a catalyst.

As used herein, molasses is a by-product of the manufacture of purified sugars or the soluble material obtained from the treatment of wood. For example, the final effluent obtained in the preparation of sucrose by repeated evaporation, crystallization and centrifugation of juices from sugar cane and from sugar beets is referred to as molasses. During the manufacture of the sucrose, crystallization is used to remove sucrose from a super-saturated solution. After crystallization, the solution left behind includes a complex mixture of compounds which varies in composition according to plant source, location grown, season, age, and weather conditions. Furthermore, the efficiency and steps taken to crystallize the sucrose can result in compositional variation between molasses. For example, with the improvement of continuous centrifugation methods, the extraction of crystallized sucrose has become more efficient, therefore, modern molasses contains relatively less sucrose.

Examples of molasses include cane molasses, which is a by-product of the manufacture or refining of sucrose from sugar cane. Beet molasses is a by-product of the manufacture of sucrose from sugar beets. Citrus molasses is the partially dehydrated juices obtained from the manufacture of dried citrus pulp. Hemicellulose extract is a mixture of pentose and hexose sugars which is a by-product of the manufacture of pressed wood. Specifically hemicellulose extract is a molasses that is the concentrated soluble material obtained from the treatment of wood at elevated temperature and pressure without use of acids, alkalis, or salts. Starch molasses is a by-product of dextrose manufactured from starch derived from corn or grain sorghums wherein the starch is hydrolyzed by enzymes and/or acid.

A representative molasses is a liquid being approximately 25% water by weight. Molasses may be diluted or evaporated to adjust the weight percent of water; however, as used herein, the weight percentages are based on a molasses that includes 25% by weight water. Molasses is characterized as having a high concentration of sugars; for example, molasses may have total sugars of about 50% by weight. This concentration may vary significantly; concentrations of total sugars in molasses may vary from about 30-60% by weight. The density of molasses ranges from about 1.3 to about 1.5 g/mL and organic matter comprises about 55-70%. Nitrogen content may vary from about 0.5-3% as determined by elemental analysis. The nitrogen content is in the form of proteins, amino acids, and oligomers thereof. Protein may comprise about 5-10% of the total weight. The ratio of C:N as determined by elemental analysis may be in the range from about 50:1 to about 15:1.

The sugar content is primarily a mixture of sucrose, dextrose, and fructose. The mixture also contains a number of vitamins and minerals which remain soluble during the crystallization of the sucrose. For example, elemental analysis shows that molasses is a source of calcium, potassium, chloride, magnesium, sulfur, sodium, copper, iron, manganese, and zinc. Other amino acids and vitamins found within molasses include biotin, folic acid, inositol calcium pantothenate, pyridoxine, riboflavin, thiamine, niacin, and choline. Molasses may act as a buffer with a pH in the range of about 4 to about 7.

In illustrative embodiments, a binder composition comprises a molasses having a carbon to nitrogen ratio of less about 27:1 as determined by elemental analysis. While not being limited to theory, it is believed that the nitrogen content of molasses is in the form of proteins and amino acids which are capable of reacting with the reducing sugars within molasses to form melanoidin products. Melanoidin products are nitrogenous polymers or oligomers which are characteristically brown in color. It is believed that molasses obtains its naturally brown color, at least in part, from the formation of these products. These melanoidin products are capable of further reaction under the appropriate conditions. For example, in the presence of carboxylic acids, ester linkages may form between 1 or more molecules of a polycarboxylic acid and one or more molecules of a melanoidin product. The concentration of the melanoidin products is believed to initially be quite low. Without dehydration, catalysis, or being subjected to curative temperatures, molasses is known to be a stable composition that does not exhibit substantial changes over time.

In illustrative embodiments, molasses comprising less than about 70% sugar by dry weight may be used to form the binder composition of the present disclosure. In one embodiment, the binder comprises a molasses including about 3% to about 16% reducing sugar by weight. In another embodiment, the molasses can be derived from sugar cane. In alternative embodiments, the molasses may be derived from alternative sources such as sugar beets, corn, maize, citrus fruits or wood products. According to one aspect of the present disclosure, the selection of molasses type may influence the relative ratio of the polymeric and monomeric polycarboxylic acids which may be used to produce a binder.

In illustrative embodiments, the binder composition is predominantly comprised of molasses. In one embodiment, the ratio of the molasses to a combination of the molasses, the polymeric polycarboxylic acid, and the monomeric polycarboxylic acid is from about 0.5 to about 0.9 by weight. In another embodiment, the ratio of the molasses to the combination of the molasses, the polymeric polycarboxylic acid, and the monomeric polycarboxylic acid is from about 0.6 to about 0.8 by weight.

In illustrative embodiments, molasses may be partially or completely substituted by dextrin. Dextrin is a term used to describe the group of low-molecular-weight carbohydrates produced by the hydrolysis of starch. Dextrins are mixtures of linear α-(1,4)-linked D-glucose polymers starting with an α-(1,6) bond. In one embodiment, the dextrin comprises maltodextrin. The method of producing the dextrin may have a substantial affect on its chemical composition, however, these methods are well-known in the art. In illustrative embodiments, the dextrin is derived from flora-derived starch. In one embodiment, the flora is a tuber such as a potato, cassava, arrowroot, yam, or sweet potato. In another embodiment, the flora is a seed such as corn, corn, rye, rice, barley, millet, oats or sorghum. In yet another embodiment, the flora is a nut such as chestnut, sweet chestnut, or hazel nut. In yet another embodiment the flora is a vegetable as peas or bean.

In illustrative embodiments, the dextrin has a dextrose equivalent of about 5 to about 100. In one embodiment, the dextrin has a dextrose equivalent of about 10 to about 75. In another embodiment, the dextrin has a dextrose equivalent of about 15 to about 50.

One aspect of the present disclosure is that molasses is a renewable feed-stock. As such, the materials bound with a binder of the present disclosure may be manufactured using a predominantly bio-based renewable feed-stock. Accordingly, the binder is predominantly bio-based and is thus not predominantly petroleum-based.

In illustrative embodiments, the binder composition comprises a polymeric polycarboxylic acid. As used herein, a polymeric polycarboxylic acid is an organic polymer or oligomer containing more than five pendant carboxy group. A polymeric polycarboxylic acid may be a homopolymer or copolymer prepared from unsaturated carboxylic acids including, but not necessarily limited to, acrylic acid, methacrylic acid, crotonic acid, isocrotonic acid, maleic acid, cinnamic acid, 2-methylmaleic acid, itaconic acid, 2-methylitaconic acid, α,β-methyleneglutaric acid, and the like. Alternatively, the polymeric polycarboxylic acid may be prepared from unsaturated anhydrides including, but not necessarily limited to, maleic anhydride, itaconic anhydride, acrylic anhydride, methacrylic anhydride, and the like, as well as mixtures thereof. Methods for polymerizing these acids and anhydrides are well-known in the chemical art. The polymeric polycarboxylic acid may additionally comprise a copolymer of one or more of the aforementioned unsaturated carboxylic acids or anhydrides and one or more vinyl compounds including, but not necessarily limited to, styrene, α-methylstyrene, acrylonitrile, methacrylonitrile, methyl acrylate, ethyl acrylate, n-butyl acrylate, isobutyl acrylate, methyl methacrylate, n-butyl methacrylate, isobutyl methacrylate, glycidyl methacrylate, vinyl methyl ether, vinyl acetate, and the like. Methods for preparing these copolymers are well-known in the art. In illustrative embodiments, the polymeric polycarboxylic acid comprises homopolymers and copolymers of polyacrylic acid. In another embodiment, the polymeric polycarboxylic acid comprises homopolymers and copolymers of maleic anhydride.

In illustrative embodiments, the polymeric polycarboxylic acid is a low molecular weight polymer. As used herein, the term low molecular weight polymer includes those polymers having a molecular weight of less than about 10,000 g/mol. In one embodiment, the polymeric polycarboxylic acid has a molecular weight of from about 1000 to about 8000 g/mol. In another embodiment, the polymeric polycarboxylic acid has a molecular weight from about 2000 to about 5000 g/mol. One aspect of the present disclosure is that the molecular weight of the polymeric polycarboxylic acid may affect the weatherability of the resulting binder. The utility of higher molecular weight polymeric polycarboxylic acids may be limited by solubility, viscosity, or structural limitations.

Illustratively, a polymeric polycarboxylic acid may be an acid, for example, polyacrylic acid, polymethacrylic acid, polymaleic acid, and like polymeric polycarboxylic acids, copolymers thereof, anhydrides thereof, and mixtures thereof. Examples of commercially available polyacrylic acids include AQUASET-529 (Rohm & Haas, Philadelphia, Pa., USA), CRITERION 2000 (Kemira, Helsinki, Finland, Europe), NF1 (H. B. Fuller, St. Paul, Minn., USA), and SOKALAN (BASF, Ludwigshafen, Germany, Europe). With respect to SOKALAN, this is a water-soluble polyacrylic, polymer or copolymer. Grades of SOKALAN include homopolymers of acrylic acid and various copolymers. For example, one grade is a homopolymer of acrylic acid having a molecular weight of approximately 4000 g/mol. Another example is a copolymer of acrylic acid and maleic acid having a molecular weight of approximately 4000 g/mol. AQUASET-529 is a composition containing polyacrylic acid cross-linked with glycerol, also containing sodium hypophosphite as a catalyst. CRITERION 2000 is an acidic solution of a partial salt of polyacrylic acid, having a molecular weight of approximately 2000 g/mol. With respect to NF1, this is a copolymer containing carboxylic acid functionality and hydroxy functionality, as well as units with neither functionality; NF1 also contains chain transfer agents, such as sodium hypophosphite or organophosphate catalysts.

In one embodiment, the binder composition comprises a polymeric polycarboxylic acid. In one embodiment, the binder composition comprises a polymeric polyacrylic acid. In another embodiment, the binder composition comprises a copolymer of an acrylic acid and a maleic anhydride. In another embodiment, the binder composition comprises a polymeric polycarboxylic acid having a molecular weight of about 2000 to about 6000 g/mol.

In illustrative embodiments, the binder composition comprises a monomeric polycarboxylic acid. As used herein, the term "polycarboxylic acid" indicates a dicarboxylic, tricarboxylic, tetracarboxylic, pentacarboxylic, and like monomeric polycarboxylic acids, and anhydrides, and combinations thereof. Illustratively, a monomeric polycarboxylic acid may be a dicarboxylic acid, including, but not limited to, unsaturated aliphatic dicarboxylic acids, saturated aliphatic dicarboxylic acids, aromatic dicarboxylic acids, unsaturated cyclic dicarboxylic acids, saturated cyclic dicarboxylic acids, hydroxy-substituted derivatives thereof, and the like.

Illustratively, the polycarboxylic acid(s) itself may be a tricarboxylic acid, including, but not limited to, unsaturated aliphatic tricarboxylic acids, saturated aliphatic tricarboxylic acids, aromatic tricarboxylic acids, unsaturated cyclic tricarboxylic acids, saturated cyclic tricarboxylic acids, hydroxy-substituted derivatives thereof, and the like. It is appreciated that any such polycarboxylic acids may be optionally substituted, such as with hydroxy, halo, alkyl, alkoxy, and the like.

In one embodiment, the polycarboxylic acid is the saturated aliphatic tricarboxylic acid, citric acid. In another, the polycarboxylic acids is aconitic acid, adipic acid, azelaic acid, butane tetracarboxylic acid dihydride, butane tricarboxylic acid, chlorendic acid, citraconic acid, dicyclopentadiene-maleic acid adducts, diethylenetriamine pentaacetic acid, adducts of dipentene and maleic acid, ethylenediamine tetraacetic acid (EDTA), fumaric acid, glutaric acid, isophthalic acid, itaconic acid, maleic acid, malic acid, mesaconic acid, biphenol A or bisphenol F reacted via the KOLBE-Schmidt reaction with carbon dioxide to introduce 3-4 carboxyl groups, oxalic acid, phthalic acid, sebacic acid, succinic acid, tartaric acid, terephthalic acid, tetrabromophthalic acid, tetrachlorophthalic acid, tetrahydrophthalic acid, trimellitic acid, trimesic acid, or the like, or anhydrides, or combinations thereof. In another embodiment, the monomeric polycarboxylic acid is a mixture of citric acid and maleic acid or maleic anhydride.

One aspect of the present disclosure is that the monomeric polycarboxylic acid and the polymeric polycarboxylic acid work in a synergistic manner as crosslinking agents for constituents of the molasses as described herein. When exposed to curative temperatures, the monomeric polycarboxylic acid and the polymeric polycarboxylic acid are capable of forming ester linkages between the various constituents of the molasses. Furthermore, as described herein, the monomeric polycarboxylic acid and the polymeric polycarboxylic acids facilitate the reaction which results in the formation of additional melanoidin products. Additionally, the monomeric and polymeric polycarboxylic acid may crosslink polyesters and/or polymeric melanoidins. In illustrative embodiments, the catalyst facilitates esterification reactions within the scope of the foregoing reactions. Additionally, the polycarboxylic acid may serve in a catalytic role in the esterification and the Maillard reactions. The result of the melanoidin forming reactions and the polyester forming reactions is a polymeric network which has a highly cross-linked polymer network of substantial complexity with surprisingly beneficial properties as a binder.

Another aspect of the present disclosure is that the combination of the monomeric polycarboxylic acid and the polymeric polycarboxylic acid overcomes limitations observed when either of a monomeric polycarboxylic acid or a polymeric polycarboxylic acid was used individually as a crosslinking agent. Specifically, it was observed that when a monomeric polycarboxylic acid was used without the addition of a polymeric polycarboxylic acid, the weatherability of the binder was insufficient for many applications. Furthermore, binders comprising a polymeric polycarboxylic acid to the exclusion of a monomeric polycarboxylic acid yielded binders with sufficient strength and weatherability, but had other adverse properties. For example, the viscosity of the reactive binder solution was comparatively high, the cure times were relatively longer, and the expense of the composition was relatively larger.

While not being limited to theory, it is believed that the advantage in mixing the monomeric and the polymeric polycarboxylic acid stems in part to the difference in physical and chemical properties that distinguish these materials. Particularly, the differences in properties observed in a substantially dehydrated state. For example, the pKa of a monomeric polycarboxylic acid will be relatively lower than that of a corresponding polycarboxylic acid due to the effect of charge delocalization along the polymeric backbone. Accordingly, the monomeric polycarboxylic acid will have a relatively larger influence on the acid catalysis of the esterification than the polymeric polycarboxylic acid due to its comparatively greater acidity. Furthermore, the monomeric polycarboxylic acid is capable of more complete homogenization throughout the dried uncured reaction mixture compared to the relatively larger polymeric polycarboxylic acid.

For example, a polymeric chain may contain several hundred carboxylic acid groups in relatively close proximity. Accordingly, in a substantially dried state, pockets which contain very high local concentrations of strictly carboxylic acid functionality to the exclusion of melanoidin or sugar molecules may exist if the polymeric polycarboxylic acid was used alone. However, the small molecular weight of the monomeric polycarboxylic acid lowers the probability (i.e., it is entropically unfavorable) that a high concentration of carboxylic acid functionalities are in close proximity. Thus, the inclusion of the monomeric polycarboxylic acid provides the dried binder with a relatively higher degree of homogeneity for the dispersion of carboxylic acid functionality. In another aspect, the increased homogenization may improve availability of the reactive carboxylic acid groups to the molasses constituents. Another aspect is that the relatively small molecular cross-section of the monomeric polycarboxylic acid improves its diffusion capabilities in a substantially dry reactive mixture. Again, this aspect would positively contribute to the availability of the carboxylic acid functionality to participate in esterifications.

One aspect in which the polymeric polycarboxylic acid contributes to the synergistic relationship is that it possesses a relatively higher number of carboxylic acid groups which are capable of crosslinking more compounds through esterification. This facilitates the quick formation of relatively large polymeric units, thus increasing physical performance of the binder, such as tensile strength. Furthermore, the cross-linked molecular backbones will have as their backbones the carbon-carbon bonds associated with the polymeric polycarboxylic acid as opposed to the esters. It is hypothesized that the presence of more carbon-carbon bonds within the binder contributes to the improved weatherability of this binder composition. It may be that these attributes, at least in part, provide for the unexpected synergism between the monomeric polycarboxylic acid and the polymeric polycarboxylic acid within the scope of the present disclosure.

In illustrative embodiments, the monomeric polycarboxylic acid and the polymeric polycarboxylic acid are added in substantially equivalent weights, the combination being as much as 50% of the total weight of the binder. In one embodiment, the ratio of the monomeric polycarboxylic acid to the combination of the molasses, the polymeric polycarboxylic acid, and the monomeric polycarboxylic acid is from about 0.05 to about 0.4 by weight. In another embodiment, the ratio of the monomeric polycarboxylic acid to the combination of the molasses, the polymeric polycarboxylic acid, and the monomeric polycarboxylic acid is from about 0.1 to about 0.3 by weight. In another embodiment, the ratio of the polymeric polycarboxylic acid to the combination of the molasses, the polymeric polycarboxylic acid, and the monomeric polycarboxylic acid is from about 0.01 to about 0.4 by weight. In another embodiment, the ratio of the polymeric polycarboxylic acid to the combination of the molasses, the polymeric polycarboxylic acid, and the monomeric polycarboxylic acid is from about 0.03 to about 0.2 by weight. In another embodiment, the ratio of the polymeric polycarboxylic acid to the monomeric polycarboxylic acid is from about 0.25 to about 1.5 by weight. In yet another embodiment, the ratio of the polymeric polycarboxylic acid to the monomeric polycarboxylic acid is from about 0.5 to about 1 by weight.

In illustrative embodiments, the binder composition may include a catalyst. For example, the catalyst may be an alkali metal polyphosphate, an alkali metal dihydrogen phosphate, a polyphosphoric acid, and an alkyl phosphinic acid, an oligomer, a polymer bearing phosphorous-containing groups and mixtures thereof. Illustratively, the catalyst may be sodium hypophosphite, sodium phosphite, potassium phosphite, disodium pyrophosphate, tetrasodium pyrophosphate, sodium tripolyphosphate, sodium hexametaphosphate, potassium phosphate, potassium polymetaphosphate, potassium polyphosphate, potassium tripolyphosphate, sodium trimetaphosphate, or sodium tetrametaphosphate, or mixtures thereof. In one embodiment, the catalyst is sodium hypophosphite. In one embodiment, the ratio of the catalyst to a combination of the molasses, the polymeric polycarboxylic acid, and the monomeric polycarboxylic acid is from about 0.001 to about 0.1 by weight. In another embodiment, the ratio of the catalyst to a combination of the molasses, the polymeric polycarboxylic acid, and the monomeric polycarboxylic acid is from about 0.003 to about 0.008 by weight.

As discussed below, various additives can be incorporated into the binder composition. These additives give the binders of the present invention additional desirable characteristics. For example, the binder may include a silicon-containing coupling agent. Many silicon-containing coupling agents are commercially available from various manufacturers. For example, Dow-Corning Corporation, Petrarch Systems, AkzoNobel and by the General Electric Company. Illustratively, the silicon-containing coupling agent includes compounds such as silylethers and alkylsilyl ethers, each of which may be optionally substituted, such as with halogen, alkoxy, amino, and the like. In one variation, the silicon-containing compound is an amino-substituted silane, such as, gamma-aminopropyltriethoxy silane (General Electric Silicones, SILQUEST A-1101; Wilton, Conn.; USA). In another variation, the silicon-containing compound is an amino-substituted silane, for example, aminoethylaminopropyltrimethoxy silane (Dow Z-6020; Dow Chemical, Midland, Mich.; USA). In another variation, the silicon-containing compound is gamma-glycidoxypropyltrimethoxysilane (General Electric Silicones, SILQUEST A-187). In yet another variation, the silicon-containing compound is an n-propylamine silane (Creanova (formerly Huls America) HYDROSIL 2627; Creanova; Somerset, N.J.; U.S.A.).

The silicon-containing coupling agents are typically present in the binder in the range from about 0.1 percent to about 1 percent by weight based upon the dissolved binder solids (i.e., about 0.1 percent to about 1 percent based upon the weight of the solids added to the aqueous solution). In one application, one or more of these silicon-containing compounds can be added to the aqueous uncured binder. The binder is then applied to the material to be bound. Thereafter, the binder may be cured if desired. These silicone containing compounds enhance the ability of the binder to adhere to the matter the binder is disposed on, such as glass fibers. Enhancing the binder's ability to adhere to the matter improves, for example, its ability to produce or promote cohesion in non- or loosely assembled substance(s).

In another illustrative embodiment, a binder of the present invention may include one or more corrosion inhibitors. These corrosion inhibitors prevent or inhibit the eating or wearing away of a substance, such as, metal caused by chemical decomposition brought about by an acid. When a corrosion inhibitor is included in a binder of the present invention, the binder's corrosivity is decreased as compared to the corrosivity of the binder without the inhibitor present. In one embodiment, these corrosion inhibitors can be utilized to decrease the corrosivity of the binder-containing compositions described herein. Illustratively, corrosion inhibitors include one or more of the following, a dedusting oil, a monoammonium phosphate, sodium metasilicate pentahydrate, melamine, tin (II) oxalate, and/or methylhydrogen silicone fluid emulsion. When included in a binder of the present invention, corrosion inhibitors are typically present in the binder in the range from about 0.5 percent to about 2 percent by weight based upon the dissolved binder solids.

As described herein, binders can be used to produce or promote cohesion in non- or loosely assembled matter by placing the binder in contact with the matter to be bound. Any number of well known techniques can be employed to place the aqueous binder in contact with the material to be bound. For example, the aqueous binder can be sprayed on (for example during the binding of glass fibers) or applied via a roll-coat apparatus.

For example, these binders can be applied to a mat of mineral fibers (e.g., sprayed onto the mat), during production of mineral wool insulation products. Once the binder is in contact with the mineral fibers the residual heat from the mineral fibers (note that the mineral fibers are made from molten material and thus contain residual heat) and the flow of air through the fibrous mat will evaporate (i.e., remove) water from the binder. Removing the water leaves the remaining components of the binder on the fibers as a coating of viscous or semi-viscous high-solids liquid. Further heating of the binder may result in a substantially dry uncured reactive mixture. This coating of viscous, semi-viscous high-solids liquid or substantially dry binder functions as a binder. At this point, the mat has not been cured. In other words, the uncured binder functions to bind the mineral fibers in the mat.

Furthermore, it should be understood that the above described binders can be cured. For example, any of the above described binders can be disposed (e.g., sprayed) on the material to be bound, and then heated. For example, in the case of making mineral wool insulation products, after the aqueous binder has been applied to the mat, the binder coated mat is transferred to a curing oven. In the curing oven the mat is heated (e.g., from about 150° C. [~300° F.] to about 315° C. [~600° F.]) and the binder cures. The cured binder is a formaldehyde-free, water-resistant thermoset binder that attaches the mineral fibers of the mat together. Note that the drying and thermal curing may occur either sequentially, contemporaneously, or concurrently.

In illustrative embodiments, a method of binding loosely or non-assembled matter includes the steps of mixing a solution comprising a molasses, a monomeric polycarboxylic acid, a polymeric polycarboxylic acid, and a catalyst, disposing the solution on a collection of matter, and drying the solution to form a dehydrated reactive mixture. The method results in dehydrated reactive mixture binding the collection of matter. Illustratively, the composition as disclosed herein has properties that make it suitable for binding loosely or non-assembled matter as an uncured material. While the uncured binder may be suitable for temporary situations, it is expected that the binder will be cured. In one embodiment, the method of binding loosely or non-assembled matter includes curing the dehydrated reactive mixture. In one embodiment, the curing step includes heating the dehydrated reactive mixture to temperatures of from about 150° C. [~300° F.] to about 315° C. [~600° F.]. Illustratively, the curing step includes heating the dehydrated reactive mixture to about 1-75° C. [~350° F.]. Illustratively, the loosely or non-assembled matter may comprise a collection of mineral fibers (e.g., glass, rock wool). In illustrative embodiments, the method of binding loosely or non-assembled matter results in a binder which has a shell bone longitudinal tensile strength test result average for a weathered and a dry sample exceeds about 1.8 $MN/m^2$ and 2.3 $MN/m^2$ respectively.

In illustrative embodiments, a composite melanoidin and polyester binder comprises products of multiple reactions. First, melanoidin products may form as the result of the reaction between the nitrogeneous components of the molasses and the carbohydrate components of the molasses. This reaction may be catalyzed by and incorporate portions of the monomeric polycarboxylic acid. The melanoidins which form will have pendant hydroxyl groups derived from the carbohydrate and may undergo esterification reactions with other melanoidin products, with the polymeric polycarboxylic acid, and/or with the monomeric polycarboxylic acid. This reaction may be catalyzed by an alkali metal polyphosphate. Additionally, the carbohydrate portion of the molasses may undergo an esterification reaction with either the monomeric or polymeric polycarboxylic acid catalyzed by the alkali metal polyphosphate.

For example, amine functional compounds from the molasses may react with reducing sugars from the molasses under influence of citric acid to form melanoidin products. Furthermore, the melanoidin products may be cross-linked by an esterification reaction with the polyacrylic acid and/or a citric acid under catalysis from sodium hypophophite. Concurrently, a reaction between sugars in the molasses and the polyacrylic acid and/or citric acid could also occur under catalysis of sodium hypophosphite. In one embodiment, the ratio of the copolymer of polymeric polyacrylic acid to the monomeric polycarboxylic acid is from about 0.25 to about 1.5 by weight. In another embodiment, the polymeric polyacrylic acid has a molecular weight of about 2000 to about 6000 g/mol, In yet another embodiment, the binder includes less than about 2% Nitrogen as determined by elemental analysis. In one embodiment, the solution of the molasses with the polymeric polyacrylic acid and the monomeric polycarboxylic acid in the presence of the sodium hypophosphite catalyst has a pH from about 6 to about 11. In yet another embodiment, an aqueous extraction of the binder has a pH from about 3 to about 7.

TESTING PROCEDURES

When evaluated for their dry and weathered tensile strength, glass bead-containing shell bone compositions prepared with a given binder provide an indication of the likely tensile strength and the likely durability, respectively, of fiberglass insulation prepared with that particular binder. Predicted durability is based on a shell bone's weathered tensile strength:dry tensile strength ratio. Shell bones were prepared, weathered, and tested as follows:

Preparation Procedure for Shell Bones: A shell bone mold (Dietert Foundry Testing Equipment; Heated Shell Curing Accessory, Model 366, and Shell Mold Accessory) was set to a desired temperature, generally 200° C. [~390° F.], and allowed to heat up for at least one hour. While the shell bone mold was heating, 60 g of an aqueous ammonium polycarboxylate-molasses binder (30% in binder solids) was prepared as described in the examples set forth herein. Using a large glass beaker, 582.0 g of glass beads (Quality Ballotini Impact Beads, Spec. AD, US Sieve 70-140, 106-212 micron-#7, from Potters Industries, Inc.) were weighed by difference. The glass beads were poured into a clean and dry mixing bowl, which bowl was mounted onto an electric mixer stand. Exactly 60 g of aqueous binder were obtained, and the binder then poured slowly into the glass beads in the mixing bowl. The electric mixer was then turned on and the glass beads/ammonium polycarboxylate-sugar binder mixture was agitated for one minute. Using a large spatula, the sides of the whisk (mixer) were scraped to remove any clumps of binder, while also scraping the edges wherein the glass beads lay in the bottom of the bowl. The mixer was then turned back on for an additional minute, then the whisk (mixer) was removed from the unit, followed by removal of the mixing bowl containing the glass beads/binder mixture. Using a large spatula, as much of the binder and glass beads attached to the whisk (mixer) as possible were removed and then stirred into the glass beads/binder mixture in the mixing bowl. The sides of the bowl were then scraped to mix in any excess binder that might have accumulated on the sides. At this point, the glass beads/binder mixture was ready for molding in a shell bone mold.

The slides of the shell bone mold were confirmed to be aligned within the bottom mold platen. Using a large spatula, a glass beads/binder mixture was then quickly added into the three mold cavities within the shell bone mold. The surface of the mixture in each cavity was flattened out, while scraping off the excess mixture to give a uniform surface area to the shell bone. Any inconsistencies or gaps that existed in any of the cavities were filled in with additional glass beads/ammonium polycarboxylate-sugar binder mixture and then flattened out. Once a glass beads/binder mixture was placed into the shell bone cavities, and the mixture was exposed to heat, curing began. As manipulation time can affect test results, e.g., shell bones with two differentially cured layers can be produced, shell bones were prepared consistently and rapidly. With the shell bone mold filled, the top platen was quickly placed onto the bottom platen. At the same time, or quickly thereafter, measurement of curing time was initiated by means of a stopwatch, during which curing the temperature of the bottom platen ranged from about 160° C. [~320° F.] to about 180° C. [~355° F.], while the temperature of the top platen ranged from about 200° C. [~390° F.] to about 230° C. [~445° F.]. At seven minutes elapsed time, the top platen was removed and the slides pulled out so that all three shell bones could be removed. The freshly made shell bones were then placed on a wire rack, adjacent to the shell bone mold platen, and allowed to cool to room temperature. Thereafter, each shell bone was labeled, half were placed in a dessicator and the other half in a humidity cabinet at 55° C. [~130° F.]. All shell bones were tested the day after they were prepared.

Conditioning (Weathering) Procedure for Shell Bones: A Blue M humidity chamber was turned on and then set to provide weathering conditions of 55° C. [~130° F.] and 95% relative humidity (i.e., 55° C./95% rH). The water tank on the side of the humidity chamber was checked and filled regularly, usually each time it was turned on. The humidity chamber was allowed to reach the specified weathering conditions over a period of at least 4 hours, with a day-long equilibration period being typical. Shell bones to be weathered were loaded quickly (since while the doors are open both the humidity and the temperature decrease), one at a time through the open humidity chamber doors, onto the upper, slotted shelf of the humidity chamber. The time that the shell bones were placed in the humidity chamber was noted, and weathering conducted for a period of 12 hours. Thereafter, the humidity chamber doors were opened and one set of shell bones at a time were removed and placed individually on a wire rack and left to cool. Weathered shell bones were immediately taken to the Instron room and tested.

Test Procedure for Breaking Shell Bones: In the Instron room, the shell bone test method was loaded on the 5500 R Instron machine while ensuring that the proper load cell was installed (i.e., Static Load Cell 1 kN), and the machine allowed to warm up for fifteen minutes. During this period of time, shell bone testing grips were verified as being installed on the machine. The load cell was zeroed and balanced, and then one set of shell bones was tested at a time as follows: A shell bone was removed from its plastic storage bag and then weighed. The weight (in grams) was then entered into the computer associated with the Instron machine. The measured thickness of the shell bone (in inches) was then entered, as specimen thickness, three times into the computer associated with the Instron machine. A shell bone specimen was then placed into the grips on the Instron machine, and testing initiated via the keypad on the Instron machine. After removing a shell bone specimen, the measured breaking point was entered into the computer associated with the Instron machine, and testing continued until all shell bones in a set were tested.

Figure 1:
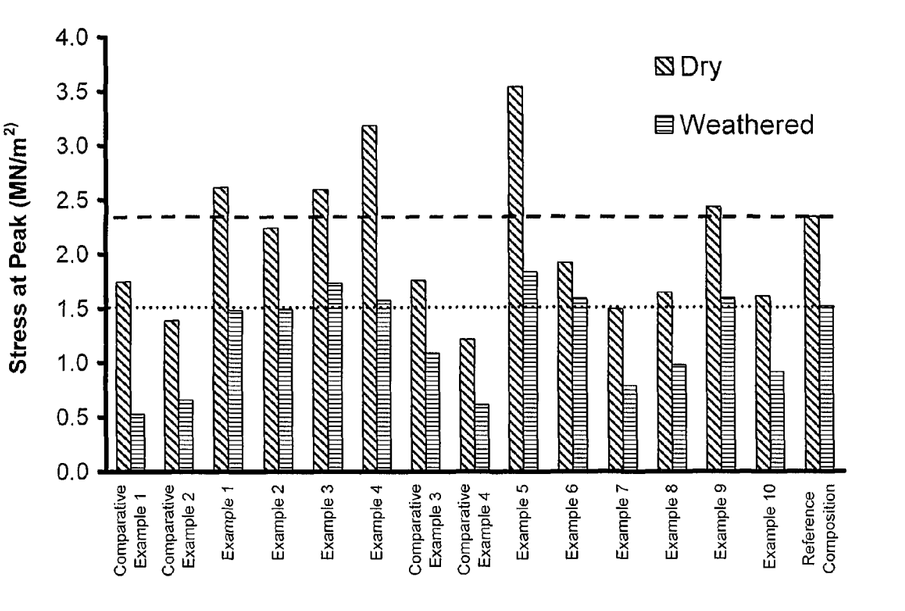
FIG. 1 shows the shell bone longitudinal tensile strength test for weathered and dry samples for comparative example 1-4, examples 1-10 and a reference composition.

Referring now to FIG. 1, shown are the shell bone longitudinal tensile strength test results for comparative samples 1-2, examples 1-12, and a reference sample. Each binder was prepared according to the following procedure:

Molasses (70 g), powdered anhydrous citric acid (20 g), and SOKALAN (BASF) (10 g) were combined in a 1-L beaker. Soft water was then added to achieve a volume of 450 mL and the resulting mixture was stirred to achieve complete dissolution of solids. To this solution, sodium hypophosphite (7.5 g) and a silane (Fluorochem, ISI 0200) (0.3 g) was added with sufficient water to bring the total volume to 500 mL. The solution was stirred for several minutes before being used as described herein for shell-bone testing. The composition and shell bone longitudinal tensile strength test result averages for of weathered and dry samples (MN/m$^2$) for comparative example 1-4 and examples 1-10 are shown in Table 1. Column A is the molasses component, column B is the monomeric polycarboxylic acid component, column C is the polymeric polyacrylic acid component and column D is the catalyst. The values in column A-C are weight ratio based on total binder weight (i.e. A/[A+B+C]). The values in column D are the weight ratio of catalyst to binder (D/[A+B+C]).

Referring again to FIG. 1, the reference composition is comprised of a melanoidin-type binder composition which has gained acceptance as a commercially viable binder for a wide range of insulation products. The composition of this sample matches that disclosed in U.S. Published Application No. 2007/0027283. Because the reference composition is regarded as a commercially successfully product, it was used as a baseline from which to compare the performance characteristics of the exemplary compositions 1-10. It is well-known to those of ordinary skill in the art that suitable performance in shell-bone testing is highly correlative to suitable performance in binding any number of types of loosely assembled or non-assembled matter, specifically cellulosic and mineral fibers.

Test results are shown in Table 1 which results are mean dry tensile strength (MN/m$^2$) and mean weathered tensile strength (MN/m$^2$).

TABLE 1

The composition and shell bone longitudinal tensile strength test result averages for of weathered and dry samples (MN/m$^2$) for comparative example 1-4 and examples 1-10.

| | A | B | C | D | Dry | Weathered | Loss/% |
|---|---|---|---|---|---|---|---|
| Comparative Example 1 | 0.6 | 0.4 | 0 | 0.075 | 1.744 | 0.528 | 69.73 |
| Comparative Example 2 | 0.5 | 0.5 | 0 | 0.075 | 1.386 | 0.654 | 52.84 |
| Example 1 | 0.7 | 0.2 | 0.1 | 0.05 | 2.612 | 1.483 | 43.21 |
| Example 2 | 0.8 | 0.1 | 0.1 | 0.05 | 2.239 | 1.49 | 33.45 |
| Example 3 | 0.6 | 0.2 | 0.2 | 0.05 | 2.591 | 1.731 | 33.21 |
| Example 4 | 0.6 | 0.2 | 0.2 | 0.025 | 3.181 | 1.574 | 50.5 |
| Comparative Example 3 | 0.6 | 0.4 | 0 | 0.05 | 1.754 | 1.086 | 38.12 |
| Comparative Example 4 | 0.4 | 0.6 | 0 | 0.05 | 1.213 | 0.615 | 49.29 |
| Example 5 | 0.4 | 0 | 0.6 | 0.05 | 3.53 | 1.832 | 48.11 |
| Example 6 | 0.4 | 0.3 | 0.3 | 0.05 | 1.918 | 1.593 | 16.96 |
| Example 7 | 0.6 | 0.35 | 0.033 | 0.075 | 1.493 | 0.786 | 47.39 |
| Example 8 | 0.6 | 0.3 | 0.067 | 0.075 | 1.644 | 0.978 | 40.48 |
| Example 9 | 0.6 | 0.2 | 0.134 | 0.075 | 2.432 | 1.598 | 34.29 |
| Example 10 | 0.5 | 0.4 | 0.067 | 0.075 | 1.611 | 0.913 | 43.29 |
| Reference | | | | | 2.341 | 1.518 | 35.17 |

TABLE 1-continued

The composition and shell bone longitudinal tensile strength test result averages for of weathered and dry samples (MN/m$^2$) for comparative example 1-4 and examples 1-10.

| | A | B | C | D | Dry | Weathered | Loss/% |
|---|---|---|---|---|---|---|---|
| Composition | | | | | | | |

Column A is the molasses component, column B is the monomeric polycarboxylic acid component, column C is the polymeric polyacrylic acid component and column D is the catalyst. The values in column A-C are weight ratio based on total binder weight (i.e. A/[A+B+C]). The values in column D are the weight ratio of catalyst to binder (D/[A+B+C]).

What is claimed is:

1. A composite melanoidin and polyester binder comprising products of reacting molasses with polyacrylic acid and citric acid in the presence of a sodium hypophosphite catalyst, wherein
   amine functional compounds from the molasses react with reducing sugars from the molasses under influence of the citric acid and hypophosphite catalyst to form melanoidin products,
   the melanoidin products are linked by an esterification reaction between the polyacrylic acid and the melanoidin products, and
   a ratio of the polymeric polyacrylic acid to the citric acid is from about 0.25 to about 1.5 by weight.

2. The composite melanoidin and polyester binder of claim 1, wherein the polyacrylic acid has a molecular weight of about 2000 to about 6000 g/mol.

3. The composite melanoidin and polyester binder of claim 1, wherein the binder includes between about 0.02% and about 2% Nitrogen as determined by elemental analysis.

4. The composite melanoidin and polyester binder of claim 1, wherein a solution of the molasses with the polyacrylic acid and the citric acid in the presence of the sodium hypophosphite catalyst has a pH from about 6 to about 11.

5. The composite melanoidin and polyester binder of claim 1, wherein an aqueous extract of the binder has a pH from about 3 to about 7.

6. A binder composition comprising a polymeric product of a reaction between molasses, a polymeric polycarboxylic acid, and a monomeric polycarboxylic acid, wherein the polymeric product comprises predominantly molasses.

7. The binder composition of claim 6, wherein the molasses is selected from a group consisting of a sugar cane molasses, a sugar beet molasses, starch molasses, citrus molasses and hemicellulose extract.

8. The binder composition of claim 6, wherein the polymeric polycarboxylic acid is selected from a group consisting of a polyacrylic acid, polymethacrylic acid, polymaleic acid, copolymers thereof, and mixtures thereof.

9. The binder composition of claim 6, wherein the polymeric polycarboxylic acid has a molecular weight of about 2000 to about 6000 g/mol.

10. The binder composition of claim 6, wherein the monomeric polycarboxylic acid is selected from a group consisting of citric acid, maleic acid, tartaric acid, malic acid, succinic acid, and mixtures thereof.

11. The binder composition of claim 6, wherein a ratio of the molasses to a combination of the molasses, the polymeric polycarboxylic acid, and the monomeric polycarboxylic acid is from about 0.5 to about 0.9 by weight.

12. The binder composition of claim 11, wherein a ratio of the monomeric polycarboxylic acid to the combination of the molasses, the polymeric polycarboxylic acid, and the monomeric polycarboxylic acid is from about 0.05 to about 0.4 by weight.

13. The binder composition of claim 12, wherein a ratio of the polymeric polycarboxylic acid to the combination of the molasses, the polymeric polycarboxylic acid, and the monomeric polycarboxylic acid is from about 0.01 to about 0.4 by weight.

14. The binder composition of claim 6, further comprising a catalyst selected from a group consisting of an alkali metal polyphosphate, an alkali metal dihydrogen phosphate, a polyphosphoric acid, an alkyl phosphinic acid, and an oligomer or a polymer bearing phosphorous-containing groups and mixtures thereof.

15. The binder composition of claim 6, further comprising sodium hypophosphite as a catalyst.

16. The binder composition of claim 14, wherein a ratio of the catalyst to a combination of the molasses, the polymeric polycarboxylic acid, and the monomeric polycarboxylic acid is from about 0.01 to about 0.1 by weight.

17. A method of binding loosely or non-assembled matter comprising the steps of mixing a solution comprising a molasses, a monomeric polycarboxylic acid, a polymeric polycarboxylic acid, and a catalyst, disposing the solution on a collection of matter, and drying the solution to form a dehydrated reactive mixture, wherein the dehydrated reactive mixture binds the collection of matter.

18. The method of binding loosely or non-assembled matter of claim 17, further comprising the step of curing the dehydrated reactive mixture.

19. The method of binding loosely or non-assembled matter of claim 18, wherein the curing step includes heating the dehydrated reactive mixture to temperatures of from about 150° C. to about 315° C.

20. The method of binding loosely or non-assembled matter of claim 18, wherein the drying step and the curing step occur substantially contemporaneously.

21. The method of binding loosely or non-assembled matter of claim 17, wherein the collection of matter are mineral fibers selected from a group consisting of glass fibers and rock wool fibers.

22. The method of binding loosely or non-assembled matter of claim 17, wherein a shell bone longitudinal tensile strength test result average for a weathered and a dry sample exceeds about 1.8 $MN/m^2$ and 2.3 $MN/m^2$ respectively.

* * * * *